United States Patent

[11] 3,625,544

| [72] | Inventors | Gordon W. Goodwin;<br>Robert D. Downs, both of Jackson, Mich. |
|---|---|---|
| [21] | Appl. No. | 868,488 |
| [22] | Filed | Oct. 22, 1969 |
| [45] | Patented | Dec. 7, 1971 |
| [73] | Assignee | Aeroquip Corporation<br>Jackson, Mich. |

[54] TRUCK-TRAILER REAR DOOR PROTECTOR
7 Claims, 11 Drawing Figs.

[52] U.S. Cl. .................................................... 280/179 R,
105/376
[51] Int. Cl. ...................................................... B60p 7/14
[50] Field of Search............................................ 280/179;
105/376; 292/36

[56] References Cited
UNITED STATES PATENTS
508,635  11/1893  Reeves ........................... 292/36

| 1,174,652 | 3/1916 | Banks............................. | 292/36 |
| 2,752,864 | 7/1956 | McDougal, Sr. et al. ...... | 280/179 X |
| 3,017,842 | 1/1962 | Nampa........................... | 105/376 |
| 3,018,741 | 1/1962 | Loomis et al. ................. | 105/376 |
| 3,324,595 | 6/1967 | Loomis........................... | 280/179 X |
| 3,336,880 | 8/1967 | Johnston ........................ | 105/376 |
| 3,433,180 | 3/1969 | Shook ............................ | 105/376 |

Primary Examiner—Benjamin Hersh
Assistant Examiner—Winston H. Douglas
Attorney—Jerry K. Harness ABSTRACT: A movable bulkhead for holding the cargo of a truck-trailer in position. The bulkhead is hinged at the top and has latches in the four corners operable by two swinging arms mounted on the bulkhead itself. In its operative vertical position, the bulkhead rolls on a pair of upper tracks, and it stores beneath the trailer roof. The bulkhead may be released in stepwise fashion from its holding position. All parts of the bulkhead are captive and not subject to loss.

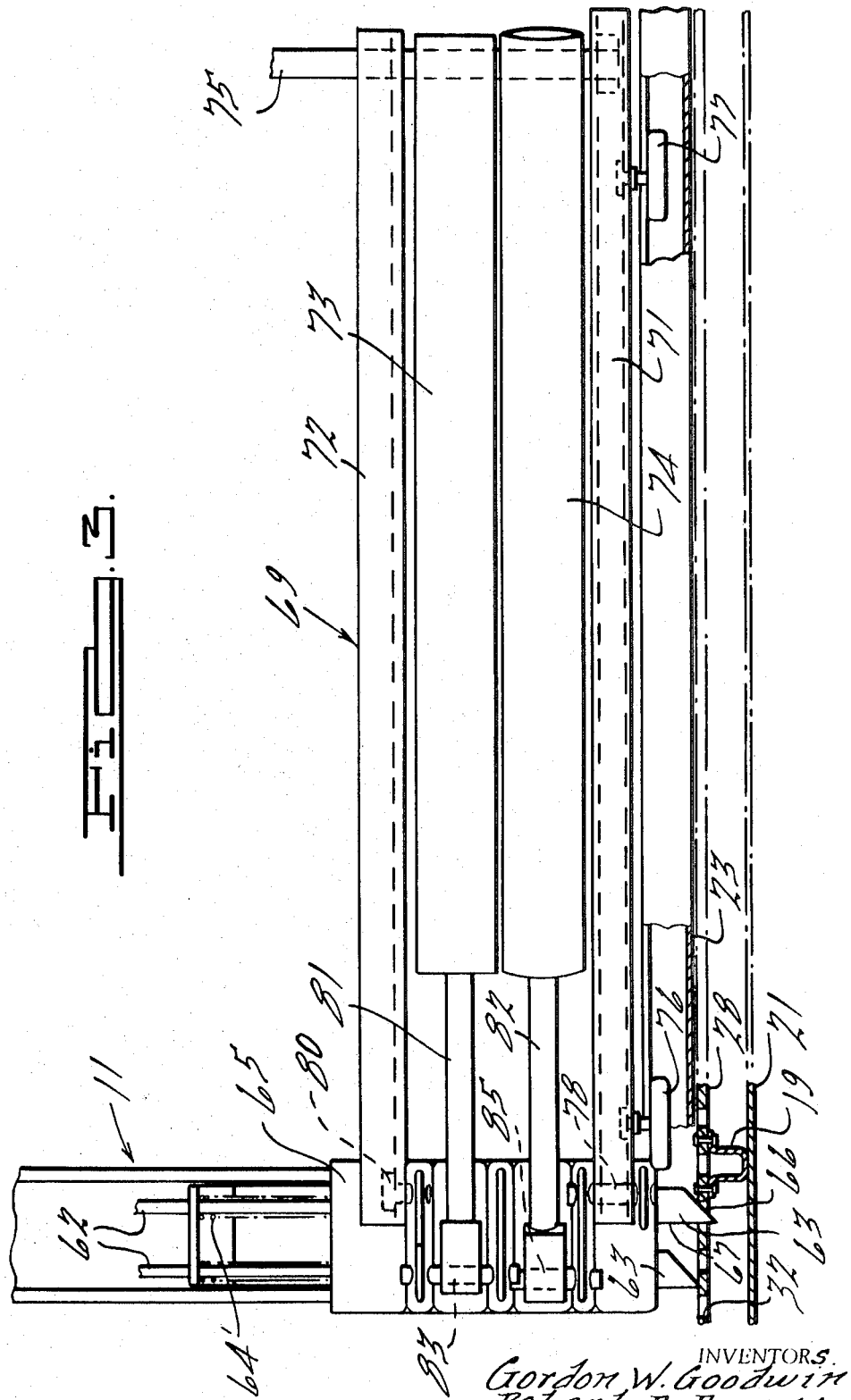

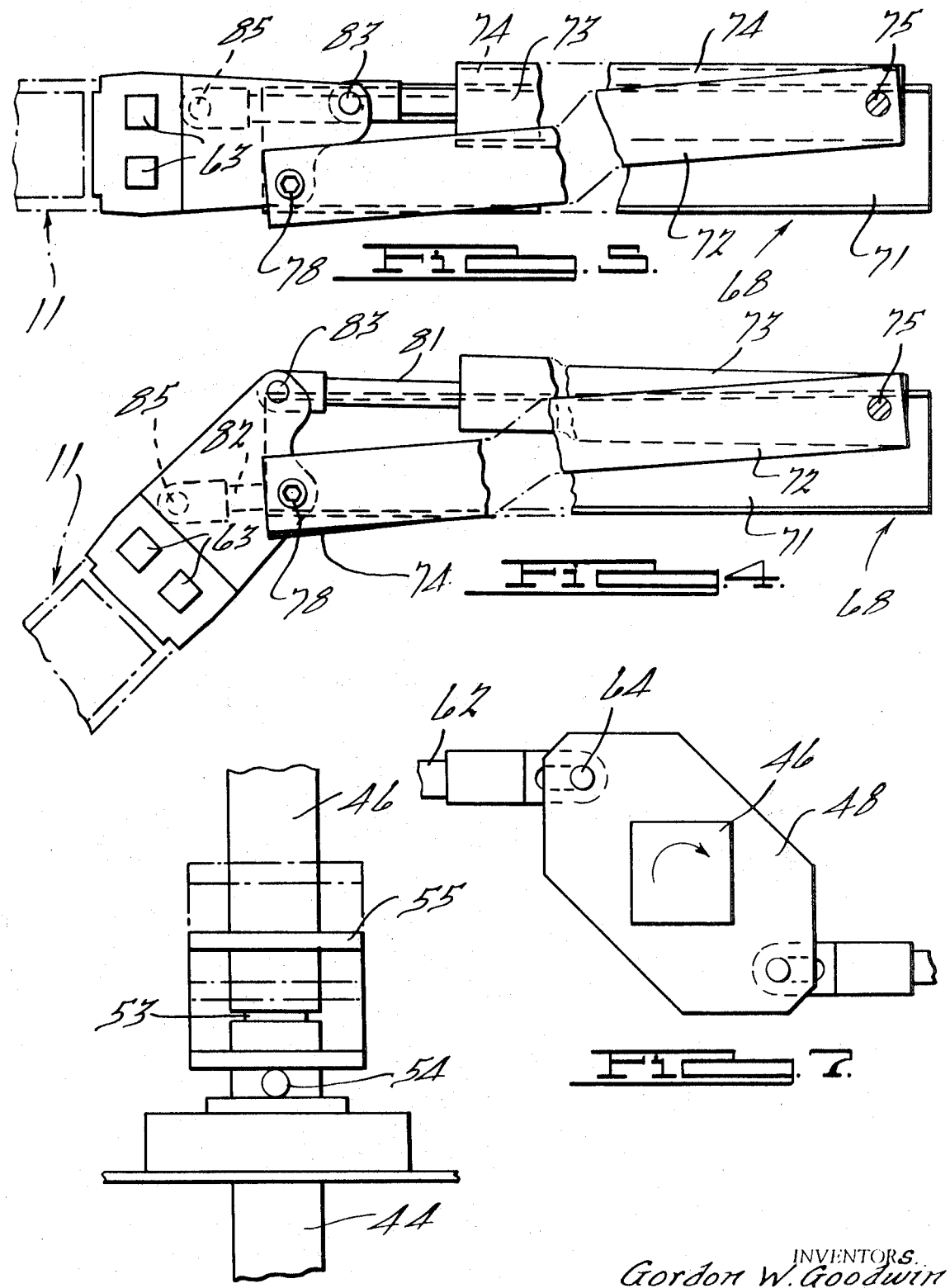

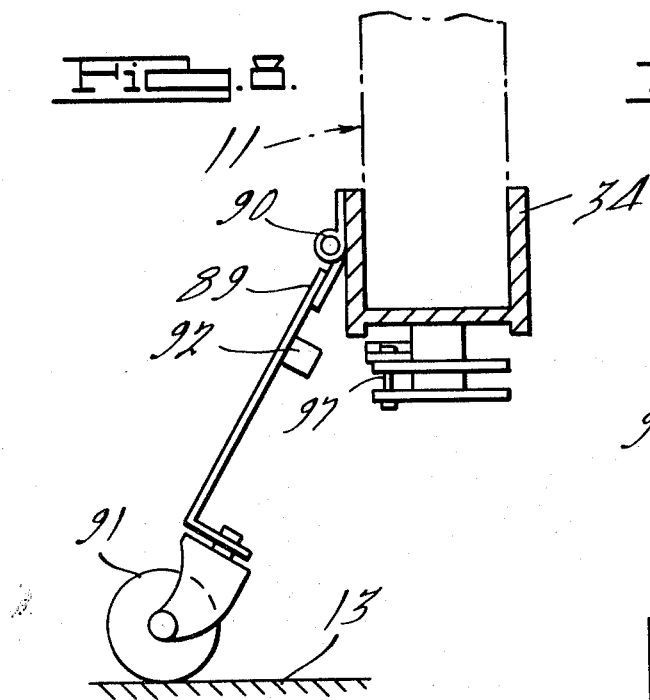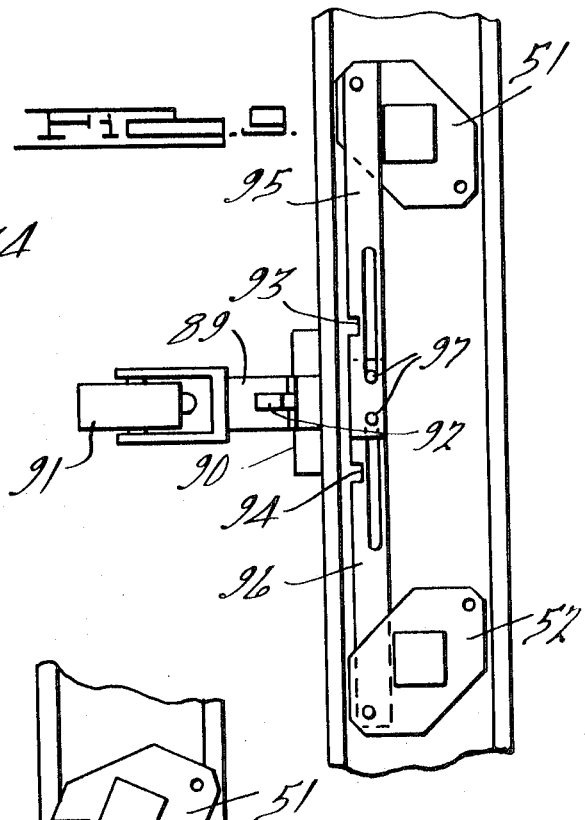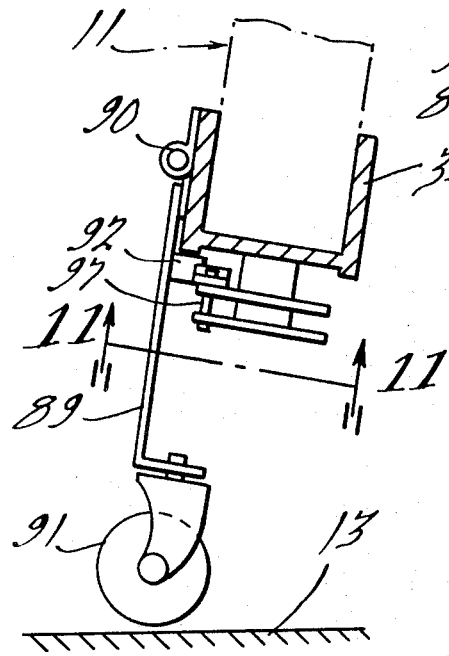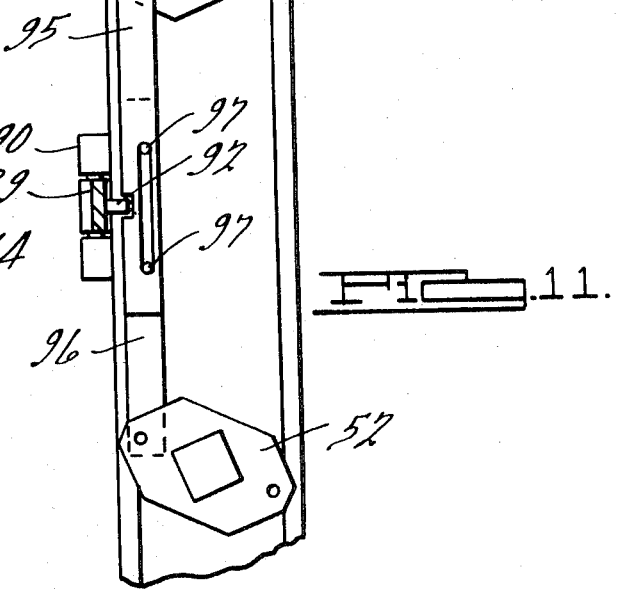

TRUCK-TRAILER REAR DOOR PROTECTOR

BACKGROUND OF THE INVENTION

1. Field of the Invention

The invention relates to truck-trailers used to transport cargo which may not occupy the entire volume of the trailer. In such instances, it is desirable to contain the cargo at the forward part of the trailer so that it will not shift during transport, thus possibly damaging or opening the rear doors.

2. Description of the Prior Art

Adjustable cargo retaining devices for truck-trailers are exemplified by equipment such as slats which are adjustably secured to the sidewalls of the trailer. Such prior devices are tedious to adjust and, since the parts are separable from the trailer itself, they are subject to misplacement, loss or breakage.

BRIEF SUMMARY OF THE INVENTION

It is an object of the invention to overcome the shortcomings of past cargo retaining means for truck-trailers and provide equipment which is easily adjustable, sturdy, and readily available for use.

According to the invention, a bulkhead extends across the trailer and is pivotally supported by a pair of upper carriages which roll along tracks mounted on the trailer sides. Overcenter springs hold the bulkhead in either a vertical cargo-retaining position or in a horizontal storage position immediately below the trailer roof. A pair of latches is provided for each of the four corners of the trailer, the latches of each pair coacting alternately with a notched keeper rail attached to the trailer side. The latches are operated by two handles mounted on the rear of the bulkhead, these handles rotating shafts to which the latches are connected. By vertically shifting one or both handles, they may be connected to only the upper latches. The handles are actuatable independently of each other, thus permitting step-by-step release of the bulkhead, either at all four corners or only at the upper corners.

Rearward adjustment of the bulkhead is accomplished with the latches held in their retracted positions by handles. When the bulkhead is rolled to its rearward position adjacent the trailer doors, it may be swung upwardly into its storage position and then rolled forwardly with the aid of a retracting device. When the bulkhead is swung upwardly toward its storage position in this manner, the latches will be automatically locked in their retracted positions, and will be released only when the bulkhead is again swung down toward its vertical position. When stored, the position of the bulkhead will be such that the operator may not inadvertently close the trailer doors. This will insure that the bulkhead is properly used at all times.

BRIEF DESCRIPTION OF THE DRAWINGS

FIG. 3 is a fragmentary top cross-sectional view of the trailer and a portion of the bulkhead as well as one of the supporting carriages.

FIG. 4 is a fragmentary elevational view showing the bulkhead in its partially raised position and illustrating the action of the position control springs.

FIG. 5 is a view similar to FIG. 4 showing the bulkhead in its storage position.

FIG. 6 is a fragmentary elevational view of a portion of two aligned shafts, showing the manner in which the handle is connected to either one or both shafts.

FIG. 7 is a plan view of the shaft and bellcrank and links which connect the shaft to the latches.

FIG. 8 is a fragmentary cross-sectional view in elevation of the latch-locking lever shown in its retracted position.

FIG. 9 is a top plan view of the latch locking lever and the notched rods with which it coacts.

FIG. 10 is a view similar to FIG. 8 but showing the lever in its locking position; and FIG. 11 is a view similar to FIG. 9 taken along the line 11-11 of FIG. 10 and showing the lever in its holding position.

DESCRIPTION OF THE PREFERRED EMBODIMENT

Figure 2:
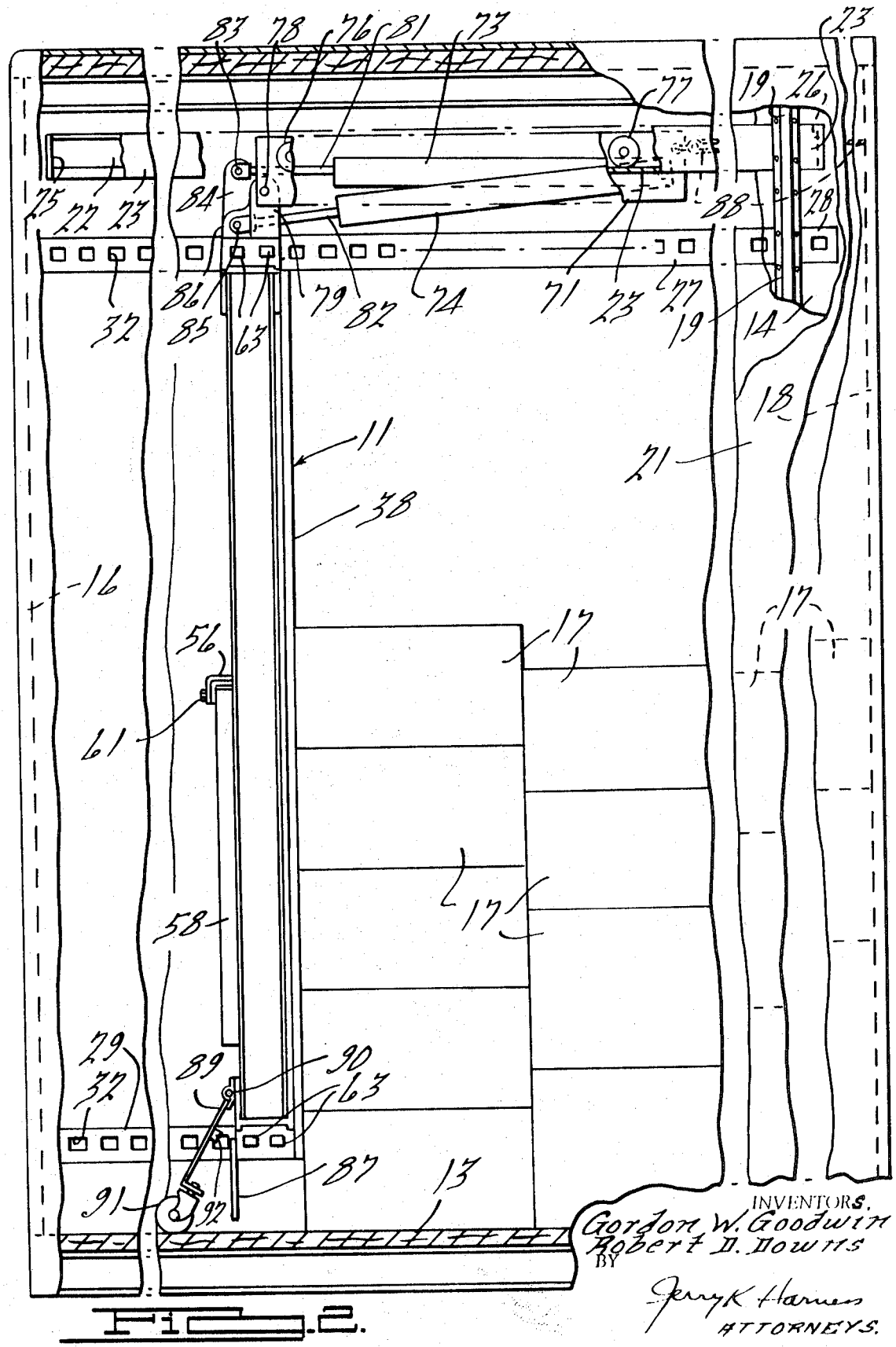
FIG. 2 is a side elevational view of the trailer in cross section, parts being broken away, showing the bulkhead in its cargo-retaining position.

The bulkhead is generally indicated at 11 and is mounted in a truck-trailer generally indicated at 12. The truck-trailer has a floor 13, a pair of inner sidewalls 14, and a ceiling 15. The trailer is also provided with a pair of swinging rear doors 16 as shown in FIG. 2.

The trailer is used to carry cargo such as cartons 17, and the purpose of the invention is to retain cargo which does not occupy the entire volume of the trailer against shifting, and more particularly, against the forward wall 18 of the trailer.

Figure 1:
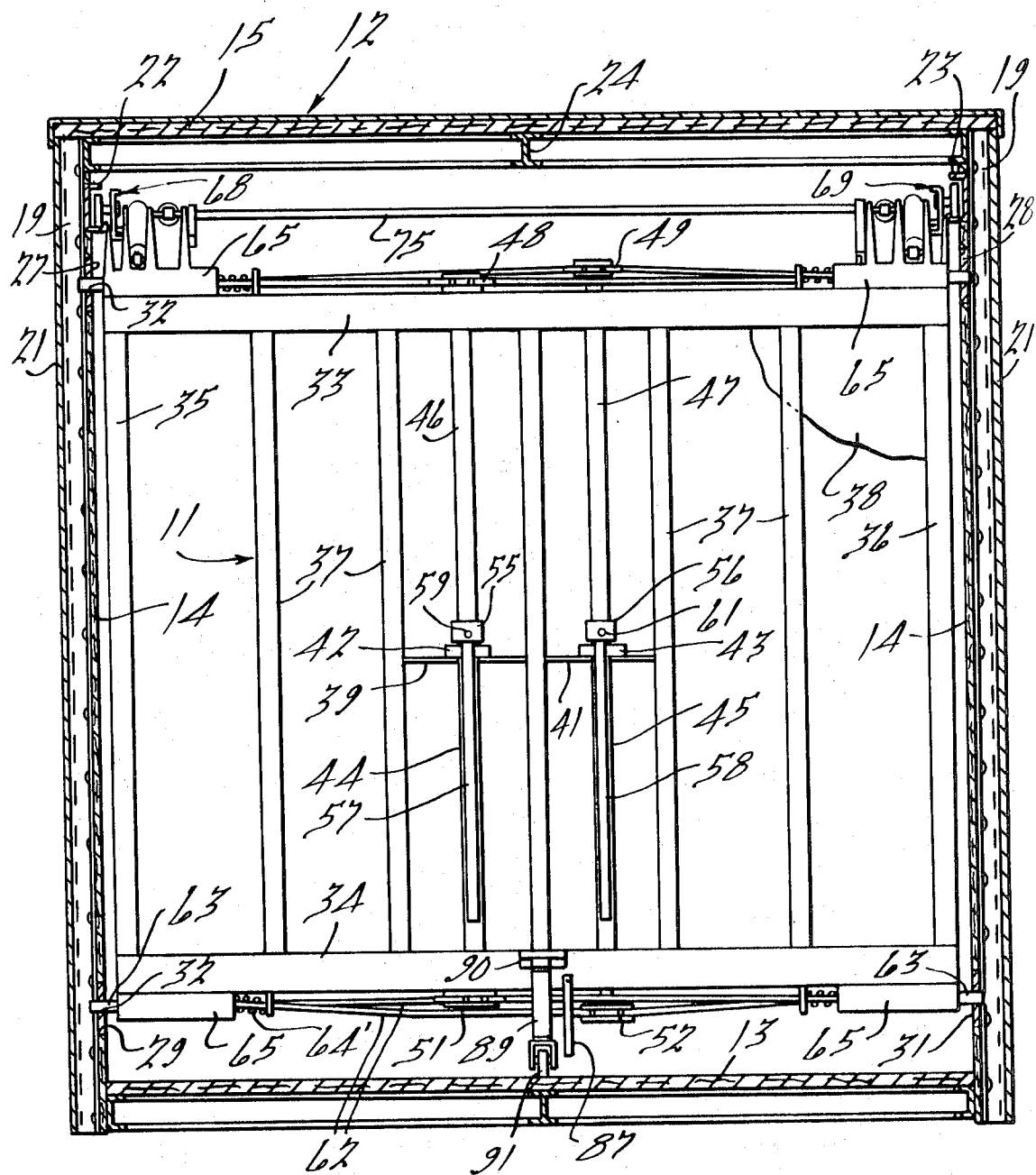
FIG. 1 is an end view of the trailer in cross section looking from the rear and showing the bulkhead in its cargo-retaining position with the latches in their latching position.

The sidewalls 14 of the trailer are secured to vertical beams 19 which in turn carry an outer skin 21. Walls 14 also carry a pair of tracks 22 and 23 respectively, these tracks being of channel-shaped cross section as shown in FIG. 1 and being located immediately below the ceiling-supporting beams 24 of the trailer. The tracks in the present embodiment extend from the rear of the trailer adjacent doors 16, forwardly a distance substantially equal to the height of bulkhead 11. Stops 25 are carried at the rearward ends of the tracks and additional stops 26 are located at the forward ends thereof.

Also carried by sidewalls 14 are four keeper rails 27, 28, 29 and 31 for retaining the bulkhead latches as described below. Rails 27 and 28 are adjacent the upper corners of the bulkhead and rails 29 and 31 adjacent the lower corners. Each rail has a series of rectangular notches or openings 32 to receive the latches.

Bulkhead 11 is of rectangular shape and is slightly narrower than the width of the trailer body between sidewalls 14. The bottom of bulkhead 11 is spaced above floor 13 and the top is below tracks 22 and 23. The bulkhead is composed of a pair of upper and lower beams 33 and 34, side beams 35 and 36, and a series of intermediate beams 37. A plywood facing 38 is secured to these beams on the side of the bulkhead facing cargo 17.

A pair of shaft-supporting members 39 and 41 extend between the three central beams 37, and support a pair of bushings 42 and 43. Hollow square shafts 44 and 45 are rotatably mounted within the circular openings in these bushings and extend downwardly therefrom. Upper hollow square shafts 46 and 47 are aligned with lower shafts 44 and 45 respectively. Shafts 46 and 47 extend through upper beam 33 while shafts 44 and 45 extend through lower beam 34. Bellcranks 48 and 49 are secured to shafts 46 and 47 respectively above beam 33, while bellcranks 51 and 52 are secured to shafts 44 and 45 respectively below beam 34. The two pairs of shafts are kept in alignment by cylindrical shafts 53 which extend between the aligned shafts and are held in place by pins 54 passing through the lower shafts 44 and 45. A pair of handle supports 55 and 56 are slidably mounted on the two pairs of shafts and are keyed thereto by having square holes through which the square shafts pass. Each handle support is capable of being moved between a lower position shown in solid lines in FIG. 6 and an upper position shown in dot-dash lines. When in the solid line position, rotation of either handle support will rotate both of its corresponding shafts 44 and 46 or 45 and 47. The handle supports normally rest on pins 54 but are capable of being independently raised to their upper position in which they are only keyed to shafts 46 and 47 but are free of shafts 44 and 45.

The means for raising and lowering the handle supports and for rotating the shafts comprises a pair of handles 57 and 58 which are pivoted at 59 and 61 respectively to handle supports 55 and 56. Handles 57 and 58 normally hang down in their rest position as shown in FIGS. 1 and 2. However, the handles are independently swingable to horizontal positions extending outwardly from their respective handle supports. When in these horizontal positions, the handles may be swung rearwardly toward each other which will rotate all four shafts if the bell-handle supports are in their lower positions. If either or both of the handle supports are in their upper positions, only the corresponding upper shafts will be rotated.

Each bellcrank 48, 49, 51 and 52 is connected to two links 62 which extend in opposite directions and carry latches 63 at their outer ends. Lost motion pin-and-slot connections 64 are used between the bellcranks and their links so that the latches may retract without rotation of the shafts. The latches are urged by springs 64' toward their latching positions in the notches 32 of keepers 27, 28, 29 and 31, and guides 65 support the latches during their sliding movement. Each of the bellcranks 48, 49, 51 and 52 is connected to two latches 63 at opposite sides of the bulkhead, there being a total of eight latches. As seen in FIG. 3, the pair of latches 63 at each corner of the bulkhead comprises a forward latch and a rear latch, and the spacing between these latches is such that only one latch at a time will enter a notch 32. Each latch 63 has a sloping forward surface 66 and a flat rearward surface 67 so that the bulkhead may be pushed forwardly in the trailer with the latches being cammed inwardly, but rearward movement of the bulkhead is resisted when one latch 63 at each corner of the bulkhead enters an aperture 32.

Bulkhead 11 is supported by a pair of carriages generally indicated at 68 and 69 in FIG. 1. Each carriage comprises a wheel-supporting member 71, as seen in FIG. 3, a frame member 72, and a pair of cylinders 73 and 74 which enclose coil springs (not shown). The forward ends of these members are supported by a rod 75 which extends between the two carriages. Member 71 carries a pair of wheels 76 and 77 which ride in track 22 or 23, the rearward end of member 71 being pivotally secured at 78 to an arm 79 (FIG. 2) extending upwardly from bulkhead 11. Frame member 72 is pivoted to bulkhead 11 by a pin 80 coaxial with pivot 78.

The two spring enclosing cylinders 73 and 74 have piston rods 81 and 82 respectively extending therefrom. Rod 81 is pivotally connected at 83 to an arm 84 (FIG. 2) extending upwardly from bulkhead 11 and rod 82 is pivotally secured at 85 to an arm 86 on bulkhead 11. When bulkhead 11 is in its vertical position, pivot 83 is above pivot 78 a predetermined distance and pivot 85 is below pivot 78 a greater distance. The springs within cylinders 73 and 74 tend to pull rods 81 and 82 forwardly, the net result of the spring actions being to hold the bulkhead in its vertical position as shown in FIG. 2. In view of the above-described holding effect of the springs, rearward adjustment of bulkhead 11 may be made by raising, rotating and pulling on handles 57 and 58 without the bulkhead swinging upwardly.

When bulkhead 11 is pulled rearwardly until wheels 76 engage stop 25, further pulling on handles 57 and 58 will cause the bulkhead to swing upwardly through the FIG. 4 to the FIG. 5 position. As this is done, the position of pivot 85 will move until it is above pivot 78, so that both springs tend to lift the bulkhead to its FIG. 5 or storage position. When in this position, the bulkhead may be rolled forwardly on tracks 22 and 23 until wheels 77 engage stops 26, and may also be swung downwardly by a strap 87 attached to the lower edge of the bulkhead. Manually actuatable means such as a block and tackle shown partially at 88 in FIG. 2 may be provided for retracting bulkhead 11 forwardly when in its storage position, this means being connected between the bulkhead and forward wall 18 of the trailer.

In order to hold latches 63 in their retracted positions when the bulkhead is being stored, a latch-locking lever 89 is provided. This lever is pivoted at 90 to the central lower portion of bulkhead 11 as seen in FIGS. 1 and 2. The lower end of lever 89 carries a wheel 91 which normally rides on floor 13 of the trailer. However when the bulkhead is swung upwardly, lever 89 will drop from its FIG. 8 to its FIG. 9 position.

The lever carries a projection 92, and this projection will enter a pair of notches 93 and 94 formed in links 95 and 96 respectively. These links are connected to bell cranks 51 and 52 as seen in FIG. 9 and are guided by pins and slots 97. Normally notches 93 and 94 are not in alignment, but when bellcranks 51 and 52 are rotated, they will become aligned as shown in FIG. 11. The bellcranks will of course be rotated by handles 57 and 58 while shaft-supporting members 55 and 56 in their lower positions as shown in FIG. 6. Thus all eight latches will be retracted and while handles 57 and 58 are held in this position, upward swinging of bulkhead 11 will lock the latches in a retracted position.

When it is desired to lower bulkhead 11, strap 87 may be pulled downwardly and when wheel 91 strikes the floor of the trailer it will withdraw projection 92 from notches 93 and 94, so that springs 64 may drive latches 63 outwardly. The bulkhead may then be pushed forwardly with latches 63 riding in and out of notches 32, until the bulkhead is pushed against the cargo.

It sometimes happens that substantial pressure will be created on bulkhead 11 after a destination has been reached because of shifting of cargo 17. In this case, it is desirable to release the bulkhead gradually so as to prevent possible damage of the cargo or injury to the operator. With the present invention, this is easily accomplished by operating handles 57 and 58 independently, and also by the selective raising of lowering of shaft-operating members 55 and 56. For example, if handle 57 alone is used, and this is done after raising shaft-operating member 55, only the two upper corners of the bulkhead will be released, and they will only be permitted to move back half the distance between two notches 32, until the retracted upper latches 63 engage the keepers. Then handle 58 may alone be operated with its shaft-operating member 56 being raised, thus again permitting only the upper portion of the bulkhead to move back slightly. Alternatively, each handle 57 and 58 may be successively operated with its shaft-operating member in the lower position so that all four corners of the bulkhead are released a little at a time. In this manner, the bulkhead may be gradually walked back so as to release the cargo in a safe and efficient manner.

In the present embodiment, the location of stops 26 is preferably such that when bulkhead 11 is in its upper or storage position, a portion of lever 89 will project outwardly through doors 16 so that the doors may not be closed. In this manner, a safety precaution is provided so that the loader cannot inadvertently close the doors without first placing bulkhead 11 in its operative position.

The operation of bulkhead 11 will be apparent from the foregoing description. Starting with a condition in which trailer 12 is backed up against a loading dock (not shown) with doors 16 opened and bulkhead 11 in its upper or storage position, cargo 17 will be loaded into the trailer starting at forward wall 18 thereof. After the cargo has been loaded, the operator will grasp strap 87 and swing bulkhead 11 downwardly until it reaches its vertical position in which it will be held by the operation of the aforesaid springs.

Wheel 91 will strike the trailer floor and release latches 63 which will enter keepers 27, 28, 29 and 31. The bulkhead may then be rolled forwardly against cargo 17, and will be held in this position by one latch in each corner of the bulkhead. Doors 16 may then be closed to provide a weatherproof closure for the trailer.

When the trailer has reached its destination against another loading dock, doors 16 will be opened and handles 57 and 58 swung to their latch-retracting positions. Latches 63 may be withdrawn from their keepers either simultaneously or, if there is considerable pressure against the bulkhead, in a gradual manner as described above. After the pressure is relieved on bulkhead 11, and both handles 57 and 58 are swung toward each other to retract all eight latches, the bulkhead may be rolled rearwardly until wheels 76 engage stops 25. Further rearward pulling of the bulkhead by handles 57 and 58 will result in the bulkhead being swung upwardly toward its storage position. The initial swinging movement will permit lever 89 to drop, locking latches 63 in their retracted position.

The bulkhead may be pushed upwardly until is is completely horizontal and then rolled forwardly into its storage position by the block and tackle 88 or other retracting apparatus. It should be noted that in its storage position the bulkhead will occupy a minimum of cargo space.

What is claimed is:

1. A truck-trailer rear door protector comprising a bulkhead extending between the sidewalls of the trailer, a pair of tracks secured to the upper portions of the trailer interior on opposite sides thereof, carriages movably mounted on said tracks and pivotally supporting said bulkhead for swinging movement between a vertical cargo-retaining position and a horizontal storage position, outwardly urged latches adjacent the four corners of said bulkhead, four keeper rails secured to the trailer interior and having rows of notches for receiving said latches, there being two latches in each corner of the bulkhead, said latches being spaced apart one-half the distance between successive notches in the corresponding keeper rail, and means mounted at the rearward side of said bulkhead for alternately retracting the latches at each corner of the bulkhead, whereby the bulkhead may be released in a stepwise fashion.

2. The combination according to claim 1, said last-mentioned means comprising two pairs of aligned shafts rotatably mounted on said bulkhead, one shaft of each pair of aligned shafts extending toward one end of the bulkhead and the other shaft toward the other end, each shaft being connected to two latches at opposite ends of the bulkhead, and means for selectively rotating either one or both shafts of each aligned pair.

3. A truck-trailer rear door protector comprising a bulkhead extending between the sidewalls of the trailer, a pair of tracks secured to the upper portions of the trailer interior on opposite sides thereof, carriages movably mounted on said tracks and pivotally supporting said bulkhead for swinging movement between a vertical cargo-retaining position and a horizontal storage position, outwardly urged latches adjacent the four corners of said bulkhead, four keeper rails secured to the trailer interior and having rows of notches for receiving said latches, means permanently mounted on the rearward side of said bulkhead for retracting said latches, and further means responsive to initial upward swinging of said bulkhead when the latches are held in their retracted position for locking said latches in said retracted position, said last-mentioned means being further responsive to return of the bulkhead to its vertical position for releasing said latches.

4. The combination according to claim 3, said last-mentioned means comprising a latch-locking lever pivotally mounted at the lower end of said bulkhead and carrying a wheel at its lower end, said wheel normally resting on the floor of the trailer so that the lever will drop from an inoperative to an operative position when the bulkhead begins its upward swinging movement, and a pair of links connected to said latches and having normally misaligned notches which will become aligned when the latches are held in their retracted position, whereby a portion of said lever may drop into said notches and hold the latches in their retracted position.

5. A truck-trailer rear door protector comprising a bulkhead extending between the sidewalls of the trailer, a pair of tracks secured to the upper portions of the trailer interior on opposite sides thereof, carriages movably mounted on said tracks and pivotally supporting said bulkhead for swinging movement between a vertical cargo-retaining position and a horizontal storage position, outwardly urged latches adjacent the four corners of said bulkhead, four keeper rails secured to the trailer interior and having rows of notches for receiving said latches, means permanently mounted on the rearward side of said bulkhead for retracting said latches, means for drawing said bulkhead forwardly in said trailer when the bulkhead has been swung to its upward position so that the bulkhead may be stored, a projection on the lower end of said bulkhead which extends rearwardly when the bulkhead has been swung upwardly to its horizontal position, and a stop limiting the forward movement of said bulkhead after it has been swung to its upper position, said stop being so located that said projection will extend beyond the rearward end of said trailer, whereby inadvertent closing of the trailer doors will be prevented.

6. A truck-trailer rear door protector comprising a bulkhead extending between the sidewalls of the trailer, a pair of tracks secured to the upper portions of the trailer interior on opposite sides thereof, carriages movably mounted on said tracks and pivotally supporting said bulkhead for swinging movement between a vertical cargo-retaining position and a horizontal storage position, outwardly urged latches adjacent the four corners of said bulkhead, four keeper rails secured to the trailer interior and having rows of notches for receiving said latches, means permanently mounted on the rearward side of said bulkhead for retracting said latches, spring-driven means connecting said carriages to the upper portions of said bulkhead in such fashion that the bulkhead will be constrained against upward swinging when it is in its vertical position but will be constrained against downward swinging when it has reached its horizontal position, said spring-driven means comprising a pair of extensible spring-driven elements connecting each side of the bulkhead to said carriage, adjacent ends of each pair of said elements being pivotally connected to said carriage and the opposite adjacent ends of said each pair being pivotally connected to said bulkhead, said last-mentioned pivoted connections to said bulkhead being spaced vertically apart when said bulkhead is in its vertical position.

7. A truck-trailer rear door protector comprising a bulkhead extending between the sidewalls of the trailer, a pair of tracks secured to the upper portions of the trailer interior on opposite sides thereof, carriages movably mounted on said tracks and pivotally supporting said bulkhead for swinging movement between a vertical cargo-retaining position and a horizontal storage position, outwardly urged latches adjacent the four corners of said bulkhead, four keeper rails secured to the trailer interior and having rows of notches for receiving said latches, means permanently mounted on the rearward side of said bulkhead for retracting said latches, said means comprising shafts rotatably mounted on said bulkhead, bellcranks and links connecting said shafts to said latches, and handles mounted on said shafts for rotating the shafts to retract said latches, there being four shafts comprising two aligned pairs, and two handles, each handle being connectable to a pair of aligned shafts, a handle support keyed to each pair of aligned shafts and pivotally supporting its corresponding handle, said handle support being slidable between a first position in which it is keyed to both shafts and a second position at which it is keyed to only one shaft.

* * * * *